US009193385B2

(12) United States Patent
Svärdby et al.

(10) Patent No.: US 9,193,385 B2
(45) Date of Patent: Nov. 24, 2015

(54) STEERING DEVICE FOR ARTICULATED VEHICLE

(75) Inventors: Sverker Svärdby, Örnsköldsvik (SE);
Patrik Forsberg, Örnsköldsvik (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 70 days.

(21) Appl. No.: 13/497,239

(22) PCT Filed: Sep. 23, 2010

(86) PCT No.: PCT/SE2010/051026
§ 371 (c)(1),
(2), (4) Date: Mar. 20, 2012

(87) PCT Pub. No.: WO2011/037531
PCT Pub. Date: Mar. 31, 2011

(65) Prior Publication Data
US 2012/0193881 A1    Aug. 2, 2012

(30) Foreign Application Priority Data

Sep. 25, 2009    (SE) ........................................ 0950701

(51) Int. Cl.
*B60D 1/24* (2006.01)
*B60D 1/60* (2006.01)
(Continued)

(52) U.S. Cl.
CPC ................ *B62D 12/00* (2013.01); *B60D 1/243* (2013.01); *B60D 1/60* (2013.01); *F41H 7/02* (2013.01)

(58) Field of Classification Search
CPC ............ B60D 1/00; B60D 1/07; B60D 1/167; B60D 1/24; B60D 1/243; B60D 1/60; B60D 1/605; D60D 1/14; B62D 12/00; B62D 13/00; F41H 7/02

USPC ................. 180/6.7, 9.44, 418, 419, 420, 235; 56/15.4; 280/418, 419, 420
See application file for complete search history.

(56) References Cited

U.S. PATENT DOCUMENTS 3,035,654 A  *  5/1962  Nuttall, Jr. et al. .......... 180/14.4
3,215,219 A      11/1965  Forsyth et al.
(Continued)

FOREIGN PATENT DOCUMENTS

DE    112007001547 T5    5/2009
GB    1427194    3/1976
(Continued)

OTHER PUBLICATIONS

International Search Report and Written Opinion received for PCT Patent Application No. PCT/SE2010/051026, mailed on Dec. 30, 2010, 10 pages.
(Continued)

*Primary Examiner* — Tony H. Winner
(74) *Attorney, Agent, or Firm* — Morrison & Foerster LLP

(57) ABSTRACT

The invention relates to a steering device for mutually steering a first vehicle unit and a second vehicle unit of an articulated vehicle, which vehicle includes a substantially vertical link shaft about which the vehicle units are pivotable, first and second steering elements arranged to mutually turn the vehicle units, wherein the steering device includes a housing configuration arranged to form a supply space between the vehicle units. The invention also relates to an articulated vehicle with a steering device.

14 Claims, 6 Drawing Sheets

(51) Int. Cl.
  *B62D 12/00* (2006.01)
  *B62D 13/00* (2006.01)
  *F41H 7/02* (2006.01)

(56) References Cited

U.S. PATENT DOCUMENTS

| | | | | |
|---|---|---|---|---|
| 3,473,619 | A * | 10/1969 | Dion | 180/9.44 |
| 3,491,847 | A * | 1/1970 | Abbott | 180/271 |
| 4,645,023 | A * | 2/1987 | Rea et al. | 180/9.44 |
| 4,727,949 | A * | 3/1988 | Rea et al. | 180/9.32 |
| 5,473,808 | A * | 12/1995 | Winters, Sr. | 29/527.6 |
| 5,632,350 | A * | 5/1997 | Gauvin | 180/9.44 |
| 5,725,063 | A * | 3/1998 | Ceragioli et al. | 180/14.4 |
| 5,873,431 | A * | 2/1999 | Butler et al. | 180/418 |
| 6,116,362 | A * | 9/2000 | Schubert et al. | 180/9.44 |
| 6,167,982 | B1 * | 1/2001 | Dillon | 180/419 |
| 6,484,485 | B2 * | 11/2002 | Dillon | 180/419 |
| 6,581,718 | B1 * | 6/2003 | Vigren et al. | 180/420 |
| 2012/0187659 | A1 * | 7/2012 | Nordberg | 280/446.1 |

FOREIGN PATENT DOCUMENTS

| | | |
|---|---|---|
| RU | 2042555 C1 | 8/1995 |
| RU | 2206859 C1 | 6/2003 |
| WO | 00/35735 A1 | 6/2000 |
| WO | WO 2008004651 A1 * | 1/2008 |

OTHER PUBLICATIONS

International Preliminary Report on Patentability received for PCT Patent Application No. PCT/SE2010/051026, mailed on Apr. 5, 2012, 7 pages.
Invitation to respond to Written Opinion received for Singapore Patent Application No. 201201098-9, mailed on May 16, 2013, 6 pages.
Russian Office Action dated Sep. 11, 2014, directed to RU Application No. 2012116533; 7 pages.

* cited by examiner

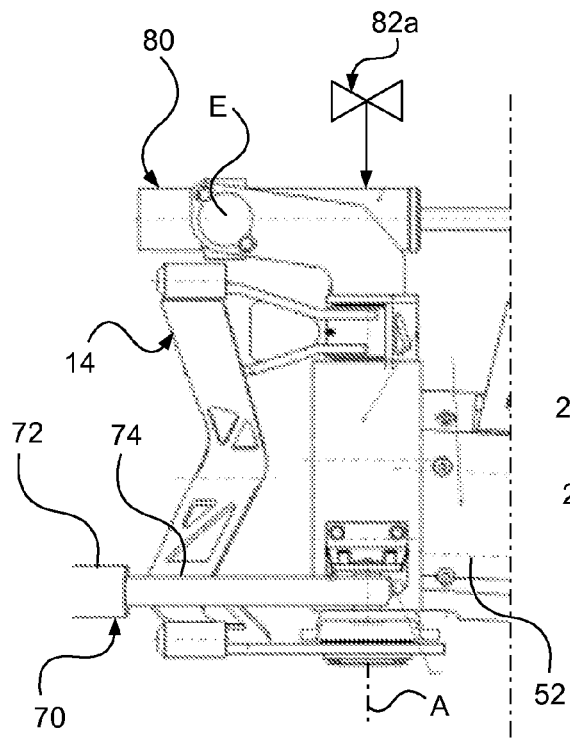
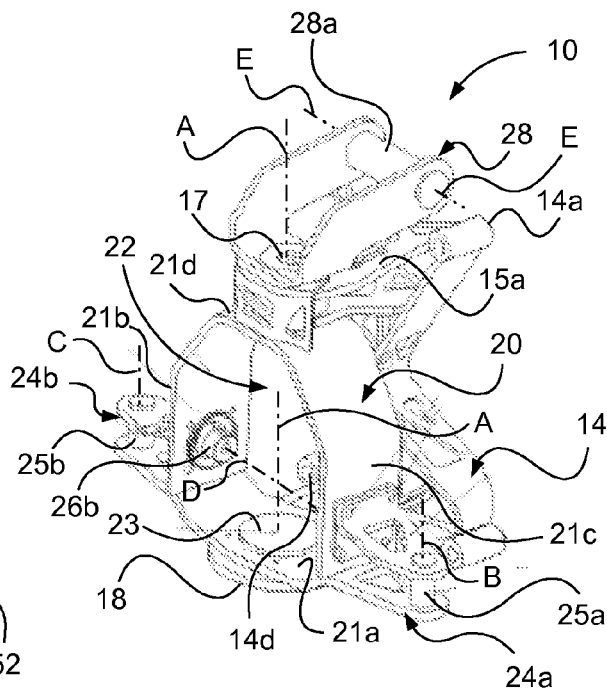
Fig. 7a    Fig. 7b
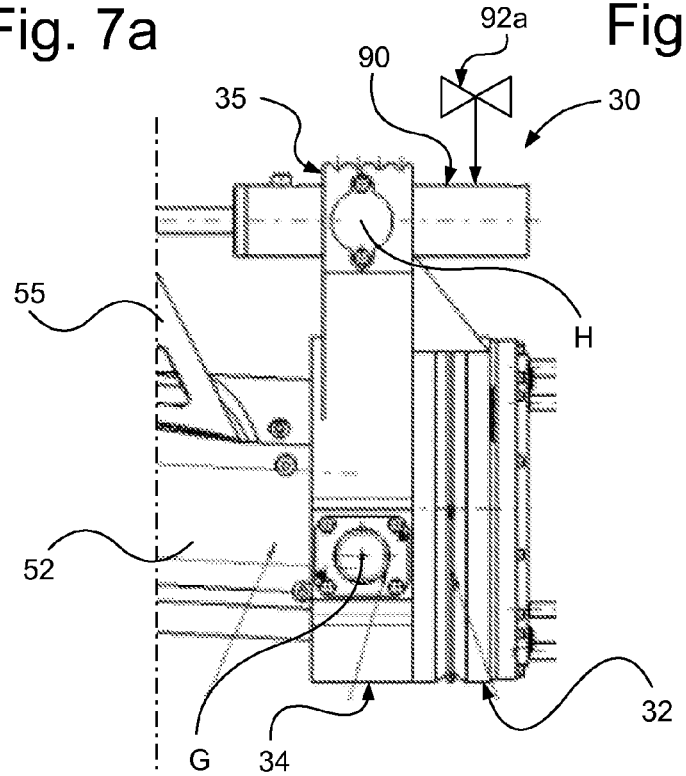
Fig. 8

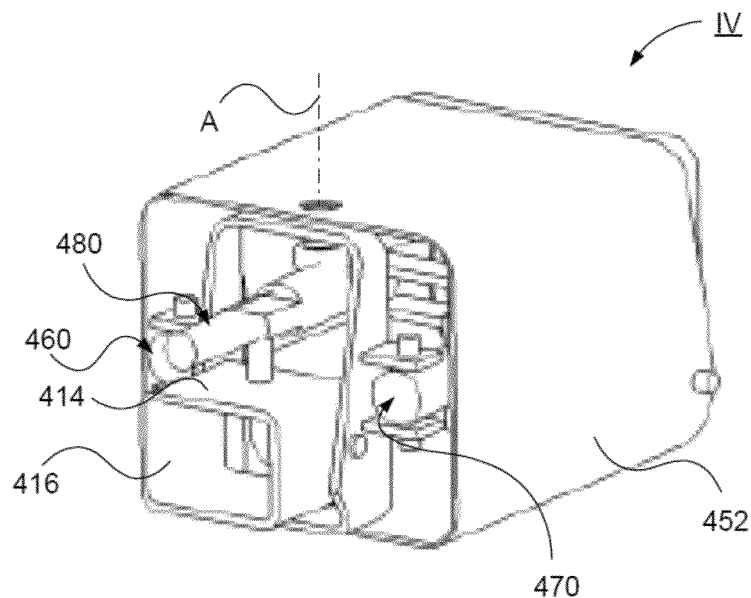
Fig. 11
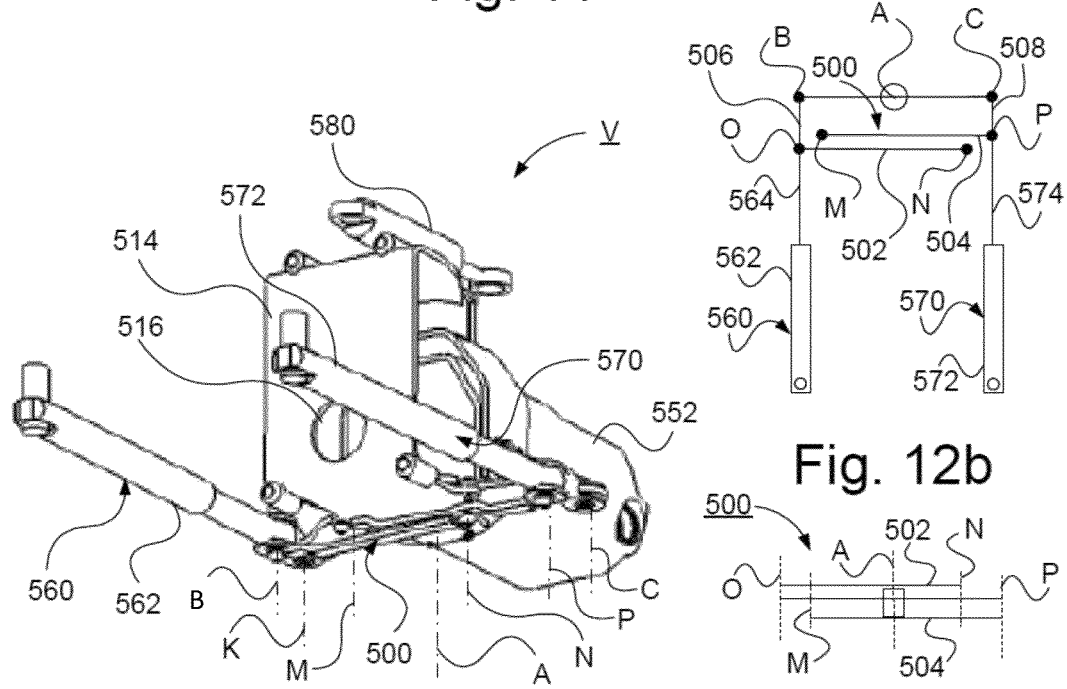
Fig. 12a
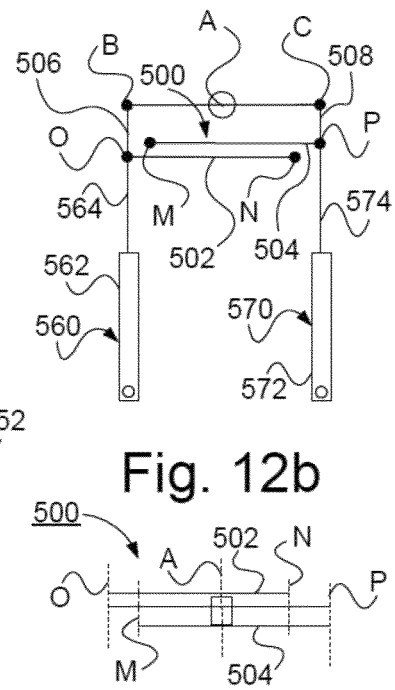
Fig. 12b
Fig. 12c

STEERING DEVICE FOR ARTICULATED VEHICLE

CROSS REFERENCE TO RELATED APPLICATIONS

This is a U.S. National Phase patent application of PCT/SE2010/051026, filed Sep. 23, 2010, which claims priority to the Swedish Patent Application No. 0950701-3, filed Sep. 25, 2009, each of which is hereby incorporated by reference in the present disclosure in its entirety.

TECHNICAL FIELD

The invention relates to a steering arrangement for an articulated vehicle according to the preamble of claim 1. The invention also relates to an articulated vehicle.

BACKGROUND

Steering arrangements for articulated vehicles, particularly articulated tracked vehicles, comprising a front vehicle unit and a rear vehicle unit steerably interconnected by means of the steering device are known. The front and rear vehicle units are interconnected over a link mechanism of the steering device comprising link shafts about which both vehicle units are mutually pivotable by means of hydraulic cylinders.

WO 00/35735 discloses a steering device for an articulated vehicle being configured in such a way that the vehicle units firstly may rotate mutually about a longitudinal, horizontal shaft, secondly turn mutually about two parallel, transversal horizontal shafts, and thirdly obtain an improved steering geometry with the vertical steering link situated centrally between the vehicle units.

Articulated vehicles with such steering devices comprises a driveline for operation of front and rear vehicle units, wherein the driveline is arranged to run from the front to the rear vehicle units in connection to the steering device/through the steering device for drive of the rear vehicle unit. Further, according to a variant of such steering devices, electricity, fuel, brake fluid and fluid for air-conditioning device are arranged to be transferred in conduits between the vehicle units in connection to/through the steering device.

Due to the fact that the steering device is exposed between the vehicle units it constitutes a weak point of the articulated vehicle. A problem with such a steering device is consequently that it is subjected to external impact, e.g. effective fire in a war situation, such that e.g. the steering of the vehicle or other sensitive function such as braking, drive function, electricity is put out of operation.

OBJECT OF THE INVENTION

The object of the invention is to provide a steering device for an articulated vehicle which improves reliability during operation.

SUMMARY OF THE INVENTION

These and other objects, apparent from the following description, are achieved by a means of steering device and an articulated vehicle, which are of the type stated by way of introduction and which in addition exhibit the features recited in the characterizing clause of selected claims.

According to the invention the objects are achieved with a steering device for mutually steering a first vehicle unit and a second vehicle unit of an articulated vehicle, which vehicle comprises a substantially vertical link shaft about which said vehicle units are pivotable, first and second steering elements arranged to mutually turn said vehicle units, wherein the steering device comprises a housing configuration arranged to form a supply space between said vehicle units.

Hereby improved reliability during operation of the articulated vehicle is facilitated in that supply means such as drive means in the form of cables for electric supply, fuel supply, supply of brake fluid for the brakes of the vehicle, e.g. water, for air-conditioning device, and cardan shaft from one of the vehicle units to the other may be protected by means of the housing configuration. The housing configuration facilitates protection against effective fire in e.g. a war situation such that drive means etc. for driving and/or steering of the vehicle becomes more difficult to eliminate. Hereby safety is improved.

According to an embodiment of the vehicle said housing configuration is essentially self supporting. This provides a well defined space which facilitates supply of the vehicle by means of e.g. drive means, cardan, etc.

According to an embodiment of the steering device said steering elements are arranged such that they are protected by one of the vehicle units. Hereby reliability is improved in that steering, due to the steering elements, e.g. hydraulic steering cylinder units, being protected by the vehicle, is difficult to eliminate by means of e.g. effective fire. Thus, improved safety is obtained in that steering is protected and the vehicle becomes more difficult to eliminate, i.e. the turning of the vehicle units and thus the ability of the vehicle to manoeuvre even when e.g. being shot at may be maintained due to the placement of the steering cylinders.

According to an embodiment of the steering device said steering elements are arranged internally to one of the vehicle units. Hereby an ability to protect the steering elements, e.g. hydraulic steering cylinder units, by means of a vehicle unit is provided, wherein reliability is improved in that steering of the vehicle becomes difficult to eliminate. The space in the vehicle unit, e.g. the engine dike, may advantageously be used and facilitates simple construction of the steering device and movement of the steering elements, e.g. hydraulic steering cylinder units.

According to an embodiment of the steering device said steering elements are arranged under one of the vehicle units. Hereby a possibility to protect the steering elements, e.g. hydraulic steering cylinder units, by means of a vehicle unit is provided wherein the reliability is improved in that steering of the vehicle becomes difficult to eliminate. Hereby no interferences on the vehicle are required.

According to an embodiment of the steering device said link shaft is disposed closer to one of the vehicle units. Hereby better protection by means of the housing configuration is facilitated. Further simpler arrangement of the steering elements, e.g. hydraulic steering cylinder units, protected by a vehicle unit is facilitated.

According to an embodiment of the steering device said housing configuration includes a preferably self supporting intermediate part supporting an upright configuration for tilt function of the vehicle. Hereby improved steering and manoeuvring of the vehicle is obtained.

According to an embodiment of the vehicle said housing configuration has a tunnel configuration. Hereby easy introduction there through of supply means such as drive means, cables for electric supply, cardan shaft etc. is facilitated.

According to an embodiment of the steering device said housing configuration has a telescope configuration. Hereby improved protection during turning of the vehicle units about the link shaft is obtained.

According to an embodiment of the steering device said housing configuration has ballistic protective properties. Hereby protection against effective fire is obtained.

According to an embodiment of the steering device said first and second steering elements comprise a first and second steering cylinder unit. Hereby a steering device with efficient steering is obtained.

DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 7a schematically illustrates a side view of a front part of the steering device in FIG. 2; and FIG. 7b schematically illustrates a perspective view of the front part in FIG. 7a;

FIG. 8 schematically illustrates a side view of a rear part of the steering device in FIG. 2;

FIG. 11 schematically illustrates a perspective view of a steering device according to a fourth embodiment of the present invention;

FIG. 12a schematically illustrates a perspective view of a steering device according to a fifth embodiment of the present invention; and FIG. 12b-c schematically illustrate different views of a link configuration of the steering device in FIG. 12a.

DETAILED DESCRIPTION

With supply space is herein intended a space of the vehicle through which supply means such as cables for electric supply, hose for fuel supply, cardan shaft for drive supply of transmission to the second vehicle unit of the articulated vehicle, conduit for cold/hot water for air-conditioning device, and/or conduit for brake fluid for supply of brakes of the articulated vehicle may be transported.

Figure 1:
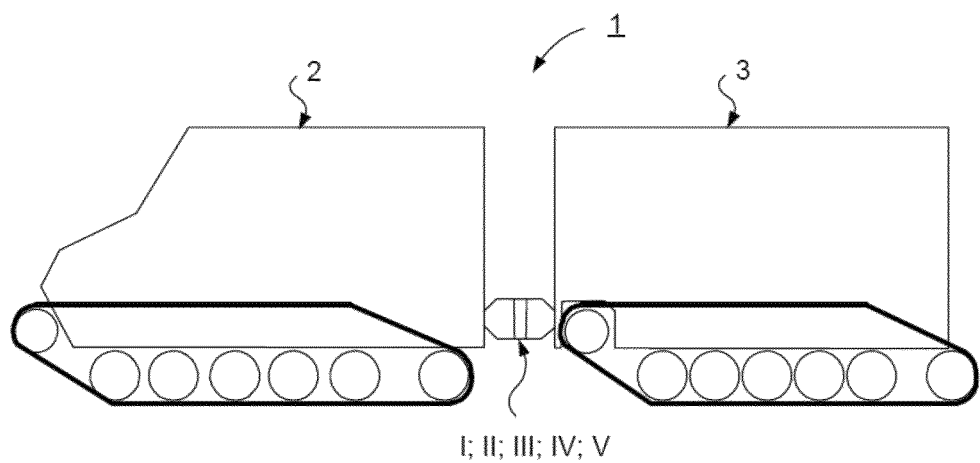
FIG. 1 schematically illustrates a side view of an articulated tracked vehicle with a steering device according to an embodiment of the present invention.

FIG. 1 schematically illustrates a side view of an articulated vehicle 1, here a tracked articulated vehicle, with a steering device I; II; III; IV; V according to any of the embodiments of the present invention. The articulated vehicle 1 comprises a first front vehicle unit 2 and a second rear vehicle unit 3 steerably interconnected by means of the steering device I; II; III; IV; V.

FIG. 2-8 schematically illustrate different views and details of a steering device I for mutually steering a first vehicle unit and a second vehicle unit of an articulated vehicle, e.g. according to FIG. 1, according to a first embodiment of the present invention.

The steering device I comprises a front part 10 being intended to be assembled at the first vehicle unit 2. According to this embodiment the first vehicle unit constitutes the front vehicle unit 2 wherein the front part is intended to be arranged on the rear end of the first front vehicle unit 2.

The steering device I comprises a rear part 30 intended to be assembled at the second vehicle unit 3, which consequently here constitutes the rear vehicle unit 3 such that the rear part is intended to be arranged at the front end of the second rear vehicle unit 3.

The steering device I in addition comprises an intermediate part 50 arranged between the front part and the rear part.

The steering device I comprises a substantially vertical link shaft A about which said vehicle units 2, 3 are pivotable.

Figure 2:
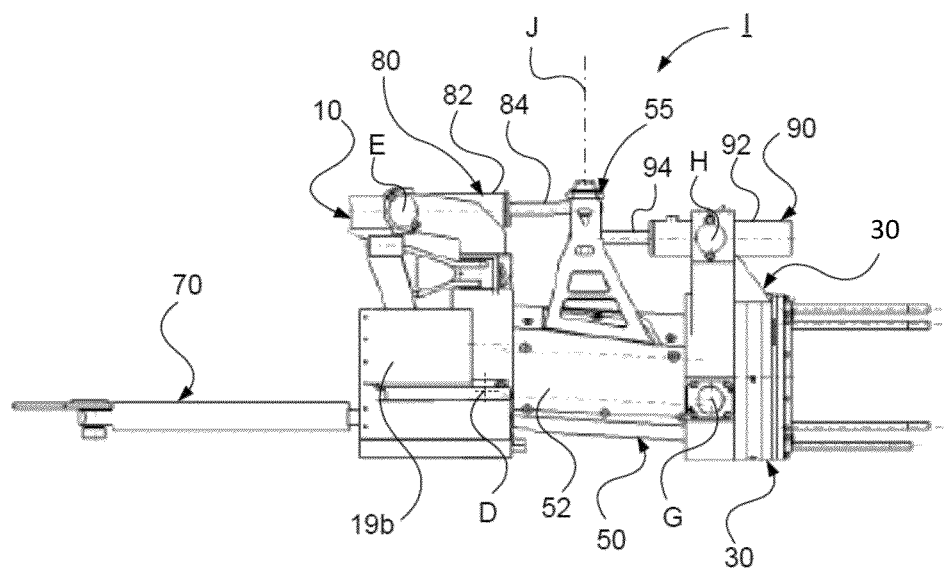
FIG. 2 schematically illustrates a side view of a steering device according to a first embodiment of the present invention.
Figure 3:
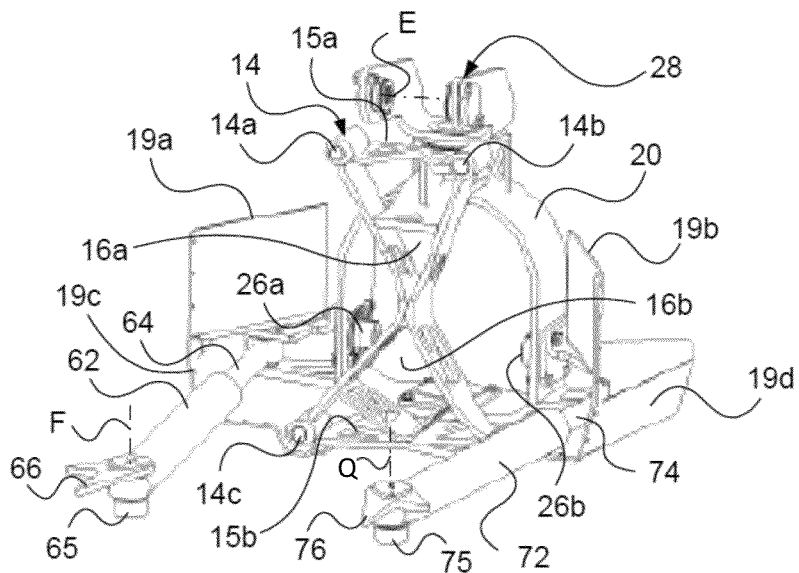
FIG. 3 schematically illustrates a perspective view of a part of a steering device in FIG. 2.

FIG. 7a schematically illustrates a side view and FIG. 7b a perspective view of the front part of the steering device I in FIG. 2. The front part comprises a front fastening member 14 for torsionally fixed assembly at the rear end of the front vehicle unit. The fastening member comprises a number of attachments 14a, 14b, 14c, 14d. The fastening member 14 has a substantially C-shaped profile with an upper roof portion 15a projecting backwardly and a lower floor portion 15b projecting backwardly. An upper longitudinally running through opening 16a is formed by the roof portion 15a and the upper portion of the X-shaped profile and a lower longitudinal through opening 16b is formed by the floor portion 15b and the lower portion of the X-shaped profile of the fastening member 14.

The front part 10 further comprises a fits steering link 20 which is pivotably connected to said front fastening member 14 about said link shaft A. Said first steering link 20 is pivotably connected to said front fastening device 14 at steering links 17, 18 of said roof portion and floor portion of the fastening device 14, i.e. about the substantially vertical shaft A.

The first steering link 20 has a substantially ring-shaped profile with a floor portion 21a, two opposite side portions 21b, 21c, and a roof portion 21d and a longitudinally running opening 22. The first steering link 20 comprises a longitudinal through opening 22. The first steering link 20 comprises a steering link 23 arranged in the floor portion and pivotably connected to the steering link 18 of the fastening member 14, i.e. about the substantially vertical shaft A. Fasteners 24a, 24b for steering cylinder unit are arranged externally to each side portion in essentially the same position between the vehicle units 2, 3 as the vertical shaft A. Each fastener is here obtained by means of a substantially vertical tap 25a, 25b arranged between an extension, extending on the respective side of the floor portion and a part projecting from each side portion such that a steering element such as a cylinder unit may be journalled about a substantially vertical shaft B, C.

The first steering link comprises a tilt bearing tap projecting internally from the respective side portion 21b, 21c towards opposite side portions and arranged in essentially the same plane as the link shaft A. The first steering link 20 in addition comprises a fastener 28 arranged in the upper portion for pivotable connection of the tilt cylinder unit about a transversal horizontal shaft E. Said fastener 28 comprises according to this embodiment a c tap 28a arranged in a retainer about which tap an end of a tilt cylinder unit is intended to be pivotably arranged.

The steering device I further comprises first and second steering elements in the form of a first and second steering cylinder units 60, 70, see e.g. FIG. 2-5, arranged to mutually turn said first and second vehicle units 2, 3. The first steering cylinder unit 60 comprises a cylinder part 62 and a piston rod part 64, and the second steering cylinder unit 70 correspondingly comprises a cylinder part 72 and a piston rod part 74. The respective cylinder unit 60, 70 is connected to the steering link 20 at the respective fastener 24a, 24b of the steering link 20 in such a way that the piston rod part 64, 74, i.e. an end portion of the piston rod, is journalled in slide bearings in the tap 25a, 25b of the fastener about the substantially vertical shafts B, C.

Figure 4:
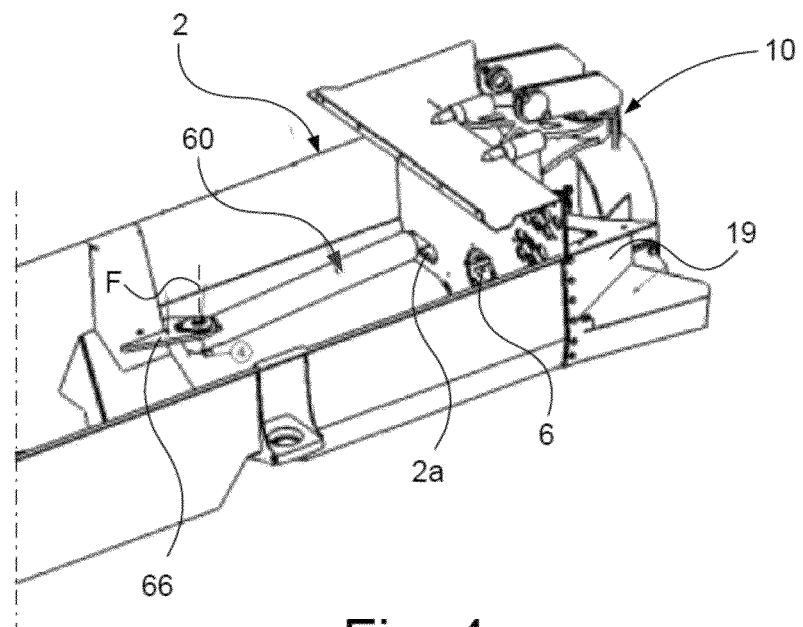
FIG. 4 schematically illustrates a perspective view of a part of the steering device in FIG. 2 interconnected to a vehicle unit.

The respective steering cylinder unit 60, 70 is arranged internally to the front vehicle unit 2 such that the front vehicle unit 2 protects said steering cylinder units 60, 70 (see FIG. 4). Each steering cylinder unit 60, 70 is connected to the front vehicle unit 2 in such a way that the cylinder part 62, 72, i.e. an end portion of the cylinder part about a substantially vertical shaft F, Q is journalled on a tap 65, 75 fixed to an element 66, 76 being fixed, according to a variant by metal sheet and welded in metal sheet internally of the front vehicle unit. According to a variant each cylinder part 62, 72 is journalled in the respective tap 65, 75 about the respective shaft F, Q with a link bearing in order to avoid bending forces in the steering cylinder units 50, 70 due to possible movements in the chassis.

As is evident from FIG. 4 each steering cylinder unit 60, 70 is arranged to be guided in the front vehicle unit 2 by a respective opening 2a. The respective opening 2a is wider than the respective steering cylinder unit 60, 70 forming a SPEL such that each steering cylinder unit 60, 70 when mutual turning of the vehicle units may move laterally in said opening 2a.

Figure 5:
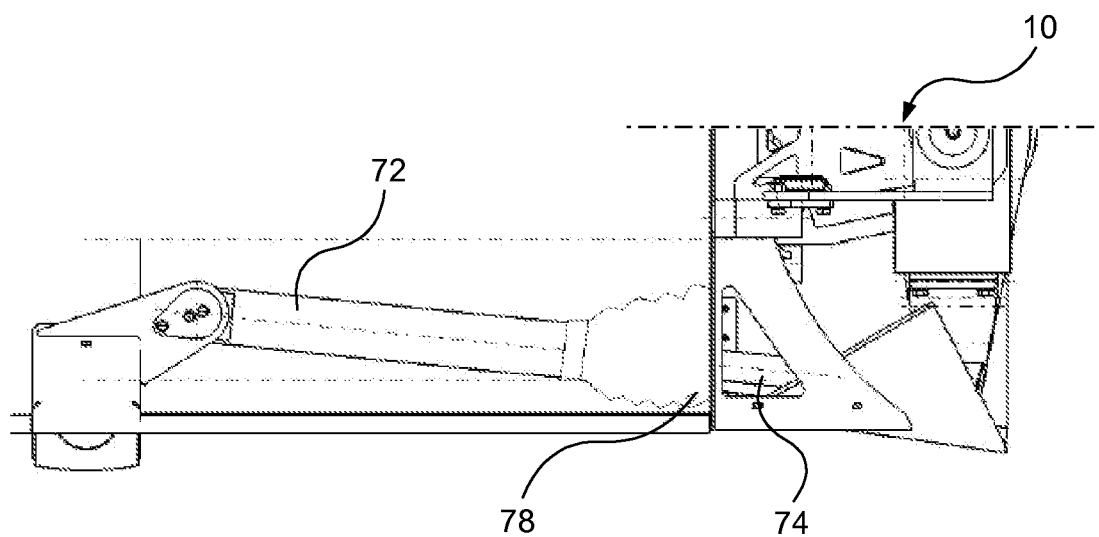
FIG. 5 schematically illustrates a side view of a part of the steering device in FIG. 2 interconnected to a vehicle unit.

In order to minimize the risk of leakage in said openings 2a when the vehicle is propelled in water, sealing members 77 have been arranged in connection to the opening 2a, as is evident from FIG. 5. According to this embodiment said sealing members 78 comprises a bellows configuration 78 arranged at the respective opening, which bellows configuration is arranged about the respective steering cylinder unit 60, 70, i.e. between steering cylinder unit 60, 70 and chassis around said opening 2a.

Said bellows configuration 78 is according to a variant of reinforced rubber material, e.g. Hypalon. According to a variant the bellows configuration 78 is arranged to the chassis by means of fasteners, e.g. a screw joint, and with a hose clip about the cylinder part 62, 72 of the respective steering cylinder unit 60, 70. The bellows configuration 78 is arranged such that it is well protected inside the chassis of the front vehicle unit 2.

According to a variant the bellows configuration 78 has such properties that it withstands exposed loads and temperatures in the range of +49 to −46° C. According to a variant the bellow configuration 78 is provided with a bristle or curtain sealing in order to prevent stones and/or smoke of snow or the corresponding from entering into the bellows configuration 78 from behind or wearing it down.

The steering cylinder units 60, 70 are arranged to cooperate in such a way that when one piston rod part 64, 74 is pulled into its cylinder part 72, 74 the other piston rod part 74, 64 is pushed out of its cylinder part 72, 62. Hereby the allied vehicle units 2, 3 are brought to be steered either to the left of the right about the vertical shaft A. According to this embodiment said steering cylinder units 60, 70 are hydraulic.

Figure 6:
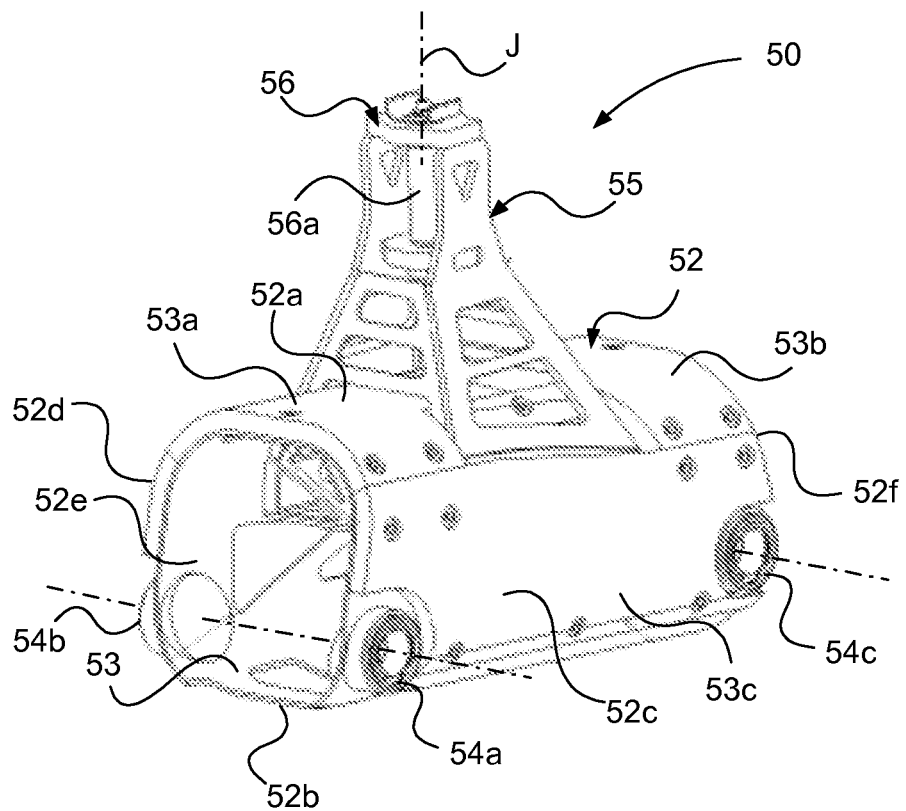
FIG. 6 schematically illustrates a perspective view of an intermediate part of the steering device in FIG. 2.

FIG. 6 schematically illustrates a perspective view of the intermediate part 50 of the steering device I in FIG. 2. The intermediate part 50 of the steering device I comprises a housing configuration 52. The housing configuration 52 is arranged to form a supply space between said vehicle units 2, 3. Said housing configuration 52 is further supporting in such a way that it is arranged to transfer power and loads between the vehicle units 2, 3. The housing configuration 52 has ballistic properties.

The housing configuration 52 has a box-like shape forming a hollow configuration through which a supply means, a cardan shaft etc. may be introduced. The housing configuration 52 comprises according to this variant a supporting structure 53 and reinforcements 53a, 53b, 53c with ballistically protecting properties applied externally to said structure. Said ballistically protecting reinforcements comprise according to an embodiment polyethylene composite with such a thickness, e.g. 20-25 mm, that protection against 7.62 Ball is obtained.

The housing configuration 52 has an upper side 52a, an under side 52b, side portions 52c, 52d, and a front end 52e and a rear end 52f. The housing configuration 52 has an essentially elongated configuration with a longitudinal through opening from one end to the other. On the respective side portion 52c, 52d tilt bearings 54a, 54b, 54c are arranged in the lower front area and lower rear area.

The intermediate part 50 further comprises an upright configuration 55 which is arranged on the upper side 52a of the housing configuration 52 projecting upwardly from the upper side in a tower like manner. The upright configuration 55 is arranged to be supported by the housing configuration 52. The upright configuration 55 comprises retainer members 56 for tilt cylinder units. The retainer member comprises according to this embodiment a tap 56a arranged substantially vertically in the upper portion of the upright configuration.

FIG. 8 schematically illustrates a side view in the rear part 30 of the steering device I in FIG. 2. The rear part 30 comprises rear fastening members 32 for assembly at the front end of the rear vehicle unit 3. The fastening member 32 comprises a number of fasteners. The fastening member comprises a roll bearing 33. The fastening member 32 comprises locking members for locking. The fastening member 32 is configured to be removably mountable to the front end of the rear vehicle unit 3.

The rear part 30 further comprises a second steering link 34 which is rotatably connected to said rear fastening member 32 about the longitudinal shaft, i.e. rotatably journalled with said roll bearing 33 in order to by means of the steering device I allow different side inclination positions of the front and rear vehicle units 2, 3.

The second steering link 34 of the rear part 30 has a substantially ring-shaped profile with a longitudinal through opening. The second steering link 34 tilt bearing tap, not shown in the figures, projecting internally from the respective side portion to opposite side portion in the direction of the longitudinal shaft G. The second steering link 34 further comprises fastener 35 arranged in the upper portion for pivotable connection of the tilt cylinder unit about a transversal shaft H. Said fastener comprises according to this embodiment a not shown transversal tap running in the direction of the shaft H and arranged in a retainer, about which tap an end of the tilt cylinder unit is intended to be pivotably arranged.

The intermediate part 50 is connected by means of bearings to the front part 10 and rear part 30. Said journalled connection between the intermediate part 50 and the front part 10 is according to this embodiment provided in that the projection tilt bearing taps 26a, 26b are journalled in the tilt bearings 54a, 54b of the lower front area of the intermediate part 50 such that the front part 10 and intermediate part 50 are pivotable about the transversal shaft D. Said journalled connection between the intermediate part 50 and the rear part 30 is according to this embodiment provided correspondingly in that the projecting tilt bearing taps being journalled in the tilt bearings 54c of the lower rear area of the intermediate part 50 such that the rear part 30 and the intermediate part are pivotable about the transversal shaft G.

Said tilt bearing taps are consequently arranged to transfer the entire steering torque, the steering torque being the torque occurring by the forces from the steering cylinder units, i.e. the torque demanded to be able to steer the vehicle by turning/braking front and rear vehicle units 2, 3 in different directions.

The upright configuration 55 is centrally arranged in the steering device I, i.e. arranged substantially in the middle of the longitudinal extension of the steering device I.

The steering device I further comprises a front tilt cylinder unit 80 and a rear tilt cylinder unit 90 as is apparent from FIG. 2. The respective tilt cylinder unit 80, 90 comprises a cylinder part 82, 92 and a piston rod part 84, 94. The respective tilt cylinder unit 80, 90 are according to an embodiment a hydraulic tilt cylinder unit 80, 90.

The front tilt cylinder unit 80 is arranged between the fastener 28, i.e. the tap 28a, arranged in the upper portion of the front steering link 20, and the tap 56a substantially vertically arranged in the upper portion of the upright configuration 55. More specifically the cylinder part 82 is pivotably journalled at the fastener 28 of the front steering link 20 about the transversal horizontal shaft E and the piston rod part 84 arranged at the fastener 56 of the upright configuration 55 about a vertical shaft.

Correspondingly the rear tilt cylinder unit 90 is arranged between the fastener 35, i.e. tap, arranged in the upper portion of the rear steering link 34, and the tap 56a substantially vertically arranged in the upper portion of the upright configuration 55. More specifically the cylinder part 92 is arranged at the fastener 35 of the rear steering link 34 about the transversal horizontal shaft H and the piston rod part 94 is arranged at the fastener 56 of the upright configuration 55 about the vertical shaft J.

The four parallel transversal horizontal shafts D, E, G, H of the steering device I facilitates for the steering device I and thereby the allied vehicle units 2, 3 to perform vertical pivotal and link movements, wherein the horizontal shafts D, E, G, H may constitute link shafts in a parallelogram, such that the steering links 20, 34 and thereby the vehicle units 2, 3, also may perform mutual movements in the vertical direction.

The steering device I further comprises front protection elements 19a, 19b, 19c, 19d in the form of a protecting plate configuration 19a, 19b, 19c, 19d arranged in connection to the front part 10 externally to the connection of the respective steering cylinder unit 60, 70 to the front part 10 in such a way that possibly, e.g. by pivoting, an exposed portion of the steering cylinder units 60, 70 is covered and protected. Said protection elements 19a, 19b, 19c, 19d preferably have ballistic properties.

The hydraulic tilt cylinder units 80, 90 are according to this embodiment arranged such that they are not protected by protective elements such as housing configuration 52 and remaining protecting plate. Thereby less protective material is required which reduces weight of the steering device I and consequently results in a lighter vehicle which reduces energy consumption and reduces fuel costs.

The tilt cylinder units 80, 90 comprise hose brake valve members 82a, 92a configured such that by possible leakage of the hydraulic tilt cylinder units 80, 90 the hydraulic system of the vehicle 1 is prevented from being emptied of oil. According to a variant, sensor means, such as level sensors, arranged in connection to the tank of the vehicle 1, wherein a signal from the sensor means is sent to the hose brake valve such that the hose brake valve is closed during leakage such that sufficient amount of oil is always available for ensuring steering and cooling of the vehicle 1. The steering device I consequently comprises means for sensing leakage of the hydraulic tilt cylinder units 80, 90 during e.g. brake. The steering device I further comprises valve members 82a, 92a for preventing leakage such that steering and/or cooling of the vehicle may be ensured.

Figure 9:
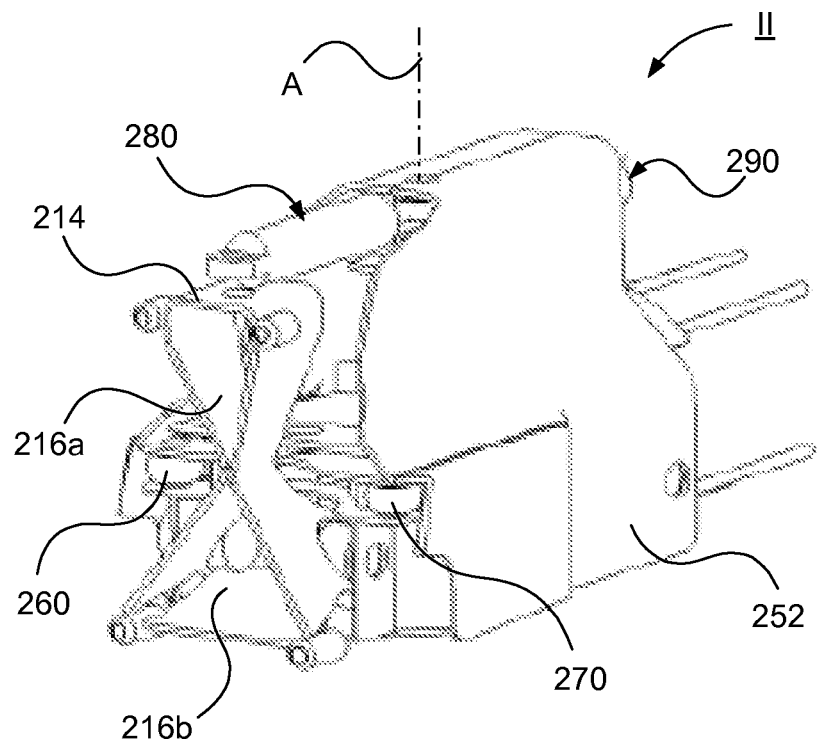
FIG. 9 schematically illustrates a perspective view of a steering device according to a second embodiment of the present invention.

FIG. 9 schematically illustrates a perspective view of a steering device II according to a second embodiment of the present invention. The steering device II according to the second embodiment differs from the steering device I according to the first embodiment among others in that the essentially vertical link shaft A about which said vehicle units 2, 3 are pivotable is centrally placed, wherein the steering cylinder units 260, 270 are arranged between two steering links and consequently exposed between the vehicle units 2, 3. Further, the housing configuration 252 is arranged in such a way that the steering cylinder units 260, 270 and also the tilt cylinder units 280, 290 are essentially surrounded such that they are protected from external damage such as effective fire.

The housing configuration 252 is also here arranged to form a supply space between said vehicle units 2, 3. The fastening member 214 of the front part has according to this embodiment opening 516a, 516b for said supply means. The housing configuration 252 constitutes according to this variant a supporting structure such that the housing configuration transfers power and loads between the vehicle parts. The housing configuration 252 has ballistically protective properties. Said ballistically protective reinforcements comprises according to an embodiment polyethylene composite with such a thickness, e.g. 20-25 mm, that protection against 7.62 Ball is obtained.

An advantage with such a solution is that a conventional steering device with the steering link centrally arranged cost efficiently may be adapted to the protective supporting housing configuration 252 without any major modifications.

Figure 10:
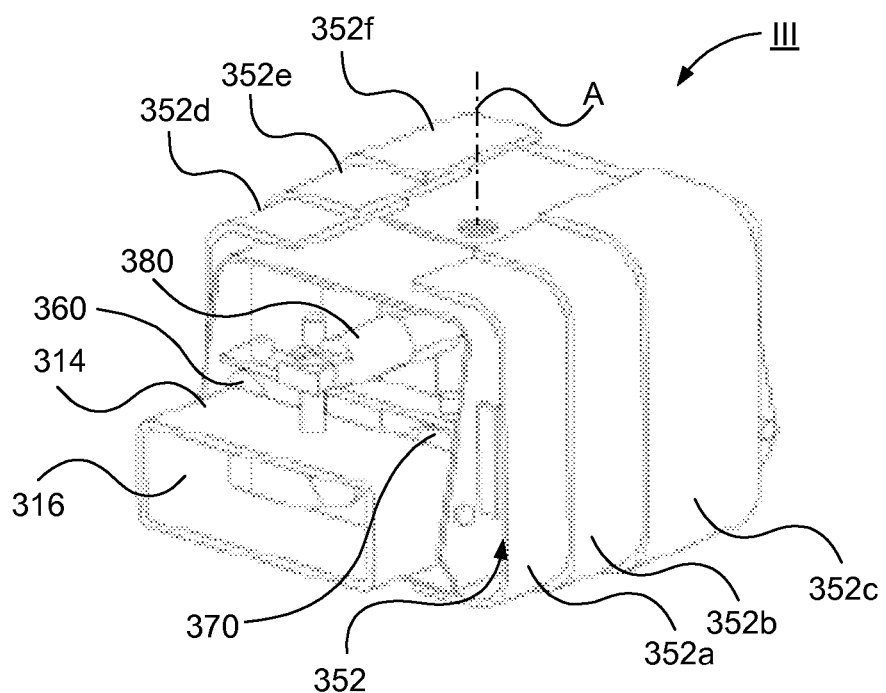
FIG. 10 schematically illustrates a perspective view of a steering device according to a third embodiment of the present invention.

FIG. 10 schematically illustrates a perspective view of a steering device III according to a third embodiment of the present invention. The substantially vertical link shaft A about which said vehicle units 2, 3 are pivotable is according to the third embodiment centrally placed, wherein the steering cylinder units 360, 370 are arranged between two steering links and consequently exposed between the vehicle units 2, 3. Further the housing configuration 352 is arranged in such a way that the steering cylinder units 360, 370 and also the tilt cylinder units, of which the front tilt cylinder unit 380 is shown, essentially surrounds such that they are protected from external damage such as effective fire.

The housing configuration 352 is also here arranged to form a supply space between said vehicle units 2, 3. The fastening member 314 of the front part has according to this embodiment an opening 316 for said supply means. The housing configuration 352 comprises according to this variant a supporting structure such that the housing configuration transfers power and loads between the vehicle units 2, 3. The housing configuration 352 has ballistically protective properties. Said ballistically protective reinforcement comprises according to an embodiment polyethylene composite with such a thickness, e.g. 20-25 mm, that protection against 7.62 Ball is obtained.

The housing configuration 352 according to this variant differs from the housing configuration according to the second embodiment in that the housing configuration 352 has a telescopic configuration. The housing configuration 352 consequently comprises protection elements 352a, 352b, 352c, 352d, 352e, 352f arranged on each side of the same partly on each other and slidably arranged relative to each other. The respective protection element on the respective side is arranged to run form an outer portion on the upper side along the side to an outer portion on the underside such that it partly surrounds a lower layer of the housing configuration 352. Said protection elements 352a, 352b, 352c, 352d, 352e, 352f slidably arranged relative to each other are arranged such that when the vehicle units turn relative to each other about the link shaft A the protection elements on one side slides together such that they cover more of each other and the protection elements on the opposite side slide apart such that they cover less of each other. Hereby a more totally covering protection even by turning of the vehicle units relative to each other is obtained.

FIG. 11 schematically illustrates a perspective view of a steering device IV according to a fourth embodiment of the present invention. The steering device IV according to the fourth embodiment differs from the steering device III according to the third embodiment in that the substantially vertical link shaft A about which said vehicle units 2, 3 are pivotable is placed closer to the front vehicle unit 2. Hereby a more homogenous housing configuration 452 is allowed, i.e. the housing configuration may be constructed in one piece instead of several sensitive parts. No telescopic function is required wherein no sensitive slide surfaces where elements slide against each other is required.

The housing configuration 452 is also here arranged to form a supply space between said vehicle units 2, 3. The fastening member 414 of the front part has according to this embodiment an opening 416 for said supply means. The housing configuration 452 comprises according to this variant a supporting structure such that the housing configuration transfers powers and loads between the vehicle units 2, 3. The housing configuration 452 has ballistically protecting properties. Said ballistically protecting reinforcements comprise according to an embodiment polyethylene composite with such a thickness, e.g. 20-25 mm, that that protection against 7.62 Ball is obtained.

FIG. 12a schematically illustrates a perspective view of a steering device V according to a fifth embodiment of the present invention and FIG. 12b-c schematically illustrate different views of a link configuration of the steering device in FIG. 12a.

In the steering device V according to the fifth embodiment is, in accordance with the first embodiment the vertical link shaft A about which said vehicle units 2, 3 are pivotable, arranged closer to the front vehicle unit 2.

The steering device V according to the fifth embodiment differs from the steering device I according to the first embodiment in that the respective steering cylinder unit 560, 570 is arranged under the front vehicle unit 2 such that the front vehicle unit 2 protects said steering cylinder units 560, 570. Hereby the respective steering cylinder unit 560, 570 is intended to be connected in bearings with the front vehicle unit in such a way that the cylinder part 562, 572, i.e. an end portion of the cylinder part is intended to be arranged under the vehicle, according to a variant between the space formed between the engine dike and the band stand of one type of front vehicle unit 2.

The steering device V according to the fifth embodiment further differs from the steering device I according to the first embodiment in that the steering device V comprises a link configuration 500 configured to reduce the angle deflection and the steering deflection of the steering cylinder units 560, 570, which facilitates placement of the steering cylinder units 560, 570 where the space for turning of the same is small, and still maintain possibility to full mutual turning of the vehicle units 2, 3 about the link shaft A.

The link configuration 500 is constituted by a four link mechanism, i.e. has four substantially vertical link shafts K, L, M, N about which link arms 502, 504 connected to each other and the steering cylinder units 560, 570 in such a way that the angle deflection is reduced, is pivotally arranged. The link configuration 500 comprises as is evident from FIGS. 12b and 12c and a first link arm 502 and a second link arm 504.

The first link arm 502 is at one end pivotably connected to the first steering cylinder unit 560 at the end of its piston rod 564 about the vertical shaft O.

The first link arm 502 is arranged to run substantially horizontally in the direction towards the second steering cylinder unit 570 and is pivotably connected to its second end adjacent to but at a distance from the second steering cylinder unit 570 about the vertical shaft N. The vertical shaft O is present at a distance from the level of the link shaft A being closer to the front vehicle unit 2, i.e. at a level in front of the level of the link shaft A.

The link configuration further comprises a third link arm 506, which is connected between a vertical link shaft B arranged at the same position between the vehicle units as and at a distance from the link shaft A and the vertical link shaft O. The third link arm 506 is pivotably connected to the link shaft B and the link shaft O.

The second link arm 504 is at one end pivotably connected to the second steering cylinder unit 570 at the end of its piston rod 574 about the vertical shaft P. The second link arm 504 is arranged to run substantially horizontally in the direction towards the first steering cylinder unit 560 and is pivotably connected at its second end adjacent to but at a distance from the first steering cylinder unit 560 about the vertical shaft N.

The link configuration further comprises a fourth link arm 508, which is connected between a vertical link shaft C arranged at the same position between the vehicle units as and at a distance from the link shaft A and vertical link shaft P. The fourth link arm 508 is pivotably connected at the link shaft B and link shaft P.

When said vehicle units 2, 3 are pivoting about the substantially vertical link shaft A the link configuration will consequently result in the angle deflection and the steering deflection of the steering cylinder units will be smaller than the steering deflection of the link arms connected between the shaft O and B; and P and C.

The housing configuration 552 is also here arranged to form a supply space between said vehicle units 2, 3. The fastening member 514 of the front part has according to this embodiment an opening 516 for said supply means. The housing configuration 552 comprises according to this variant a supporting structure such that the housing configuration transfers forces and loads between the vehicle units 2, 3. The housing configuration 552 has ballistically protective properties. Said ballistically protective reinforcements comprises according to an embodiment polyethylene composite with such a thickness, e.g. 20-25 mm, that protection against 7.62 Ball is obtained.

By arranging the steering cylinder units 560, 570 under the front vehicle unit 2 the volume of the steering device needed to be protected exposed between the vehicle units 2, 3 is reduced which results in smaller protection elements being required, which in turn leads to a lower weight. In order to further reduce the volume needed to be protected of the exposed part of the steering device V between the vehicle units, the tilt cylinder units of which the front tilt cylinder unit 580 is shown are, in accordance with the first embodiment, placed outside of the housing configuration 552, i.e. outside the protection elements, where the tilt cylinder units are provided with valve members in accordance with the first embodiment, by means which valve member the hydraulic system is prevented from being out of pressure and being emptied when during damage/leakage of the tilt cylinder unit.

The steering device I; II; III; IV; V according to first, second, third, fourth and fifth embodiments above comprise first and second steering element 60; 70; 260; 270; 460; 470; 560; 570 arranged to mutually turn said vehicle units, said steering elements being constituted by steering cylinder units with cylinder and piston, which steering cylinder units are hydraulic.

Any suitable steering elements could alternatively be used. According to an embodiment the steering elements of steering devices corresponding to said first, second, third, fourth and fifth embodiments by gear rack elements. According to an embodiment the steering elements of steering devices corresponding to said first, second, third, fourth and fifth embodiments by a linear motor, which according to a variant is built up with a ball screw and a ball nut which is arranged to run along the ball screw, wherein the nut is arranged to be moved by rotating the ball screw by means of an electric motor.

The steering cylinder units of the steering device; II; III; IV; V according to first, second, third, fourth and fifth embodiments above are hydraulic. According to an alternative embodiment the steering cylinder units of vehicles corresponding to said embodiments are pneumatic.

The steering cylinder units of the steering device; II; III; IV; V according to first, second, third, fourth and fifth embodiments above comprise tilt elements, said tilt elements being constituted by tilt cylinder units with cylinder and piston, which tilt cylinder units are hydraulic.

Any suitable tilt elements could alternatively be used. According to an embodiment the tilt elements of steering devices corresponding to said first, second, third, fourth and fifth embodiments of gear rack elements. According to an embodiment the tilt elements of steering devices corresponding to said first, second, third, fourth and fifth embodiment is constituted by a linear motor, which according to a variant is built up with a ball screw and a ball nu which is arranged to run along the bull screw, wherein the nu is arranged to be moved by rotating the ball screw by means of an electric motor.

The tilt cylinder of the steering device I; II; III; IV; V according to the first, second, third, fourth and fifth embodiments above are hydraulic. According to an alternative embodiment the tilt cylinder units of steering devices corresponding to said embodiments are pneumatic.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A steering device for mutually steering a first vehicle unit and a second vehicle unit of an articulated vehicle, wherein the steering device comprises a substantially vertical link shaft about which said vehicle units are pivotable, first and second steering elements arranged to mutually turn said vehicle units, wherein a substantially self-supporting housing configuration is arranged to form a supply space between said vehicle units, wherein said housing configuration has ballistic protective properties protecting against effective fire, and an essentially elongated configuration with a longitudinal through opening from one end to the other, such that supply means from one of the vehicle units to the other may be protected by means of the housing configuration, and wherein the housing configuration further comprises a plurality of reinforcements.

2. The steering device according to claim 1, wherein said housing configuration has a tunnel configuration.

3. The steering device according to claim 1, wherein said steering elements are arranged such that they are protected by one of the vehicle units.

4. The steering device according to claim 1, wherein said steering elements are arranged internally to one of the vehicle units.

5. The steering device according to claim 1, wherein said steering elements are arranged under one of the vehicle units.

6. The steering device according to claim 1, wherein said link shaft is presently arranged closer to one of the vehicle units.

7. The steering device according to claim 1, wherein said housing configuration includes an intermediate part supporting an upright configuration for tilt function of the vehicle.

8. The steering device according to claim 7, wherein said intermediate part is self-supporting.

9. The steering device according to claim 1, wherein said housing configuration has a telescopic function.

10. The steering device according to claim 1, wherein the supply means comprise a cardan shaft.

11. The steering device according to claim 1, wherein said first and second steering elements comprises a first and second steering cylinder unit.

12. An articulated vehicle comprising a steering device according to claim 1.

13. An articulated vehicle according to claim 12, wherein said articulated vehicle is a tracked vehicle.

14. The steering device according to claim 1, wherein the reinforcements are made of a polymer.

* * * * *